United States Patent [19]
Noriega

[11] Patent Number: 5,247,759
[45] Date of Patent: Sep. 28, 1993

[54] FISHING ROD HOLDER

[76] Inventor: Manuel Noriega, 1702 W. Charleston Ave., Phoenix, Ariz. 85023

[21] Appl. No.: 944,424

[22] Filed: Sep. 14, 1992

[51] Int. Cl.$^5$ .............................................. H01K 97/10
[52] U.S. Cl. ...................................... 43/21.2; 248/279
[58] Field of Search .............. 43/18.1, 21.2; 248/535, 248/278, 279

[56] References Cited

U.S. PATENT DOCUMENTS

| | | | |
|---|---|---|---|
| 1,091,491 | 3/1914 | Ebur | 43/21.2 |
| 2,430,112 | 11/1947 | Hamre | 43/21.2 |
| 2,905,413 | 9/1959 | Harris | 43/21.2 |
| 4,425,729 | 1/1984 | Miyamae | 43/21.2 |
| 5,088,224 | 2/1992 | Gutierrez | 43/21.2 |

Primary Examiner—Mark Rosenbaum
Assistant Examiner—Jeanne M. Elpel
Attorney, Agent, or Firm—Gregory J. Nelson

[57] ABSTRACT

A fishing pole holder for securing a fishing pole and being attachable to a boat. The holder includes a mounting securable to a boat rail or other appurtenance. The mounting includes an upwardly extending pivot post which receives a vertical tube which is pivotal about the post. The upper end of the tube carries an arm which supports a forward U-shaped support and a rearwardly extending support arm. The support arm carries a slidably adjustable U-shaped retaining member which faces downwardly. A portion of the pole rests on the forward U-shaped support member and a rearward portion of the pole or handle is received within the rear retaining member.

7 Claims, 1 Drawing Sheet

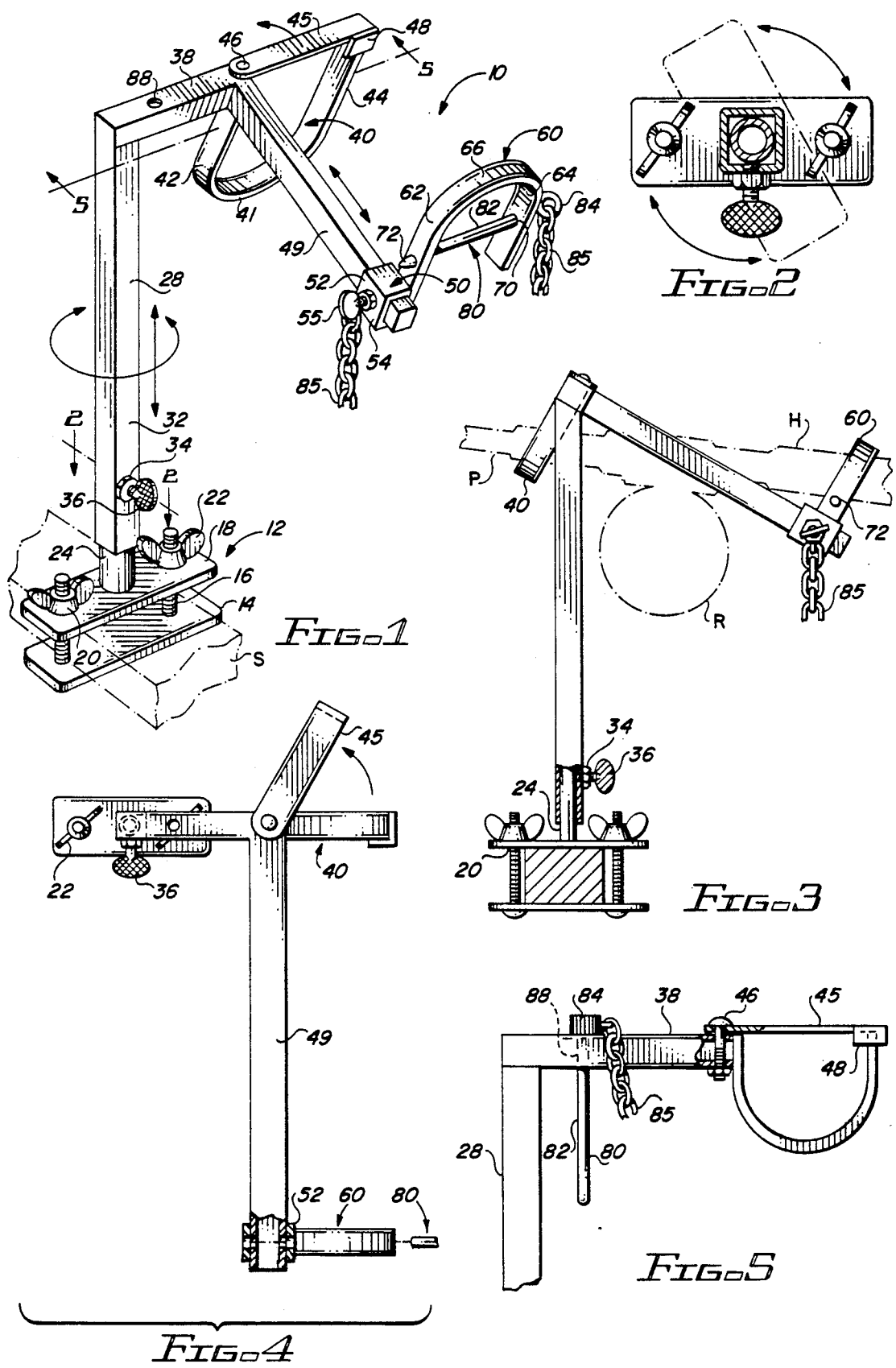

FISHING ROD HOLDER

The present invention relates to a fishing rod holder and more particularly relates to a fishing rod holder for securing a fishing rod to a boat in a fishing position and which holder allows the user to quickly and conveniently remove the fishing rod from the holder in the event of a strike.

When fishing from a boat, most fishermen cast or drop the line and attached tackle into the water and then sit or stand in the boat holding the rod in a position with the rod tip extended from the side of the boat. Often long periods of time pass while the fisherman is holding the pole waiting for some action. The waiting and long period of inactivity can be tiring. As a result, to avoid having to hold the rod for long periods, fishermen will many times rest or prop the handle of the rod in the boat using whatever structure or articles may be available. However, propping the rod in this manner is risky as the movement of the boat or the pull exerted by a fish when a strike occurs may cause the rod to become dislodged from the propped position. In many cases fishermen have lost the rod and tackle as a result of placing a rod in a boat in this way.

Accordingly, various fishing rod holders have been developed and are in common use. The following patents show representative fishing rod holders of various types.

U.S. Pat. No. 5,054,737 shows a universal support apparatus for a fishing rod which includes a base adapted for mounting on either a vertical or horizontal surface. The fishing rod holder has a receptacle on an articulated support member having opposed ends connected to the base and receptacle for movement of the receptacle about three axes.

U.S. Pat. No. 3,564,753 shows a fishing pole holder having a U-shaped base for adjustably holding a body member. The holder has a cradle at its forward end and a socket at the other end for telescopically receiving the butt-end of the fishing pole. The socket is hingedly connected to the body member on a lateral axis so that the butt-end of the pole can be rapidly removed from the socket. A bracket is attachable to the boat for receiving one or the other of the legs of the U-shaped base.

U.S. Pat. No. 5,014,458 shows a fishing pole holder which has a base which may be permanently attached to the boat. A body structure is slidably and removably attached to the base and the fishing pole holder attached to the body structure. The fishing pole holder structure consists of a generally U-shaped bracket.

U.S. Pat. No. 4,869,195 shows a pair of aligned elongate members that extend transversely across the boat. A fishing pole receiver is located on elongate member and connectors which may secure the rod for trolling behind the boat.

U.S. Pat. No. 4,517,761 shows a fishing rod holder constructed generally of one piece of wire formed to the desired shape and which is mountable on the railing of a boat without permanent attachment to the boat.

U.S. Pat. No. 4,603,501 shows a rod support which may be detachably mounted in the oar lock. The support is made of a resilient material and has a mounting post which seats in the oar lock. The support has an offset portion forming a loop and fork interconnected by a curved section.

U.S. Pat. No. 4,852,291 discloses a kit for adapting a fishing rod holder to a round or poly-sided support. The kit is provided with two pairs of inserts which are selected to fit either the round or poly-sided support. The insert members are fastened between the base plates of the support with one of the base plates connected to the rod holder. In a preferred embodiment, the base plates provide either a rail or stantion mounting for the rod holder on a boat.

U.S. Pat. No. 4,603,499 shows a motor-driven trolling device mountable to the gunwale of a fishing boat to provide automatic, power trolling action to a fishing rod held in the device.

Whereas fishing rod holders as described above are well known in common use, these fishing rod holders have not generally achieved wide acceptance. They are either cumbersome or difficult to use or are complex and inconvenient to use. Other deficiencies include the lack of convenient and quick accessibility to the fishing rod. Many of the prior art holders are not adaptable for use with a wide range of rod and reel configurations such as both open-face and close-face rods.

Accordingly, there exists a need for an improved fishing rod holder. In accordance with this need, it is a principal object of the present invention to provide a fishing rod holder of improved design.

Another object of the invention is to provide a fishing rod holder which is adaptable to receive a wide range of rod and reel configurations.

Still another object of the invention is to provide a rod holder that is easy to mount and which provides easy access to the rod in the event the rod and reel is to be quickly removed.

Still another object of the present invention is to provide a rod holder which is pivotally adjustable about a vertical axis and also adjustable axially.

Another object of the invention is to provide a fishing rod holder that conveniently secures the rod in a position so the rod can be easily mounted and removed from the boat.

Another object of the present invention is to provide a fishing rod holder which may be easily and inexpensively constructed and which once constructed is rugged and durable.

Briefly, the holder of the present invention has a pivot post attached to a bracket which is securable to a part of the boat structure such as to a rail or gunwale. A vertical square tube is pivotal about the pivot post and may be locked in any rotational position by a thumb screw. A horizontal arm extends generally perpendicular from the upper end of the tube and carries an upwardly opening U-shaped support or cradle. A locking gate may be provided which opens and closes access to the cradle. Another arm extends rearwardly and downwardly from the horizontal arm and carries an adjustable side on which is secured a downwardly opening U-shaped rear retaining member. The fishing rod is positioned in the holder with the forward end of the handle resting or engaged in the forward cradle and the rear or butt-end of the fishing rod handle received within the adjustable or slidable retaining member. A pin may be selectively engaged across the rear retaining member.

A more complete understanding of the present invention will be apparent from the following description, claims and drawings in which:

FIG. 1 is a perspective view of the fishing rod holder of the present invention with a portion of the boat rail shown in dotted lines;

FIG. 2 is a sectional view taken along line 2—2 of FIG. 1;

FIG. 3 is a side elevational view of the rod holder of the present invention with the rod handle and reel being shown in dotted lines;

FIG. 4 is a top view of the rod holder of the present invention; and

FIG. 5 is a sectional view taken along line 5—5 of FIG. 1.

Turning now to the drawings, the rod holder is generally designated by the numeral 10. The holder 10 is adapted to be used with any conventional type of fishing rod assembly, such as that shown in FIG. 3 which includes a pole "P" having a handle "H" and a reel "R". The reel may be located at a reel seat located at any position along the handle and is shown conventionally located at a forward location along the handle "H". The reel may be a open or closed-face reel. The holder of the present invention is suitable for use with most types of conventional fishing tackle, particularly the type used when fishing or trolling from a boat.

The holder 10 has a mounting assembly generally designated by the numeral 12 which mounting assembly 12 secures the holder 10 in place. As shown in FIG. 1 the holder is secured to a suitable structure "S" such as the rail extending along the gunwale of a boat. The mounting assembly includes a lower plate 14 having a pair of upwardly extending studs 16 which are spaced-apart so that the plate 14 may be positioned beneath the rail with the studs 16 extending upwardly along either side of the rail. An upper plate 18 has a pair of spaced-apart holes 20 which are adapted to receive the studs 16. Wing nuts 22 are engageable about the studs to tighten the plates 14 and 18 at either side of the rail "S". An upwardly extending post 24 projects from upper plate 18 and serves as a pivot for the holder. Other mounting brackets for side rail or flush mounting may be provided.

The holder 10 has a vertically extending tube 28 which is shown as being generally rectangular in cross-section defining a hollow interior which seats on post 24 permitting the holder to vertically pivot about the post 24. One side wall 32 of the tube 28 is provided with a bore and an aligned nut 34 which nut receives a set screw 36 to secure the holder relative to the tube 24 once the desired pivotal position has been established. Tube 28 may be any desired length but typically is approximately 8" to 12" in height to provide sufficient elevation so that the butt of the handle H of the rod clear the rail and any other projections or appurtenances on the boat.

A horizontal support arm 38 extends generally perpendicular from the upper end of the tube 28. A generally U-shaped rod cradle 40 is secured at the distal end of arm 38. U-shaped cradle has spaced-apart legs 42 and 44 and arcuate bight section 41. The end of leg 42 is secured to arm 38 so that the distal end of legs 42 and 44 are approximately in axial alignment with arm 38. A bar 45 is pivotally attached at pivot 46 to the end of arm 38. Pivot 46 is shown as a bolt and nut as seen in FIG. 5. Bar 45 has a length selected to extend across legs 42 and 44 of the cradle. The bar 45 may be pivoted to a closed position against stop 48 as shown in FIG. 1 to retain a fishing rod within the U-shaped cradle. In order to place a fishing rod within the cradle, bar 45 may be swung to an open position as shown in FIG. 4.

Depending rearwardly and downwardly from arm 38 is a tubular member 49. Member 49 is shown as being generally square in cross section and depends downward to an elevation at approximately the mid-point or above the mid-point of the vertical tube 28. A square side 50 is slidable along member 49. The slide 50 has a bore in wall 52 which aligns with threaded nut 54. A thumb screw 55 is in threaded engagement with the nut to permit the slide to be secured at any desired location along the length of the member 49.

A generally U-shaped retaining member 60 is slidable along arm member 49. U-shaped member 60 has opposite arms 62 and 64 joined at bight section 66. The U-shaped member 60 is mounted downwardly facing with the end of leg 62 secured as by welding to the slide 50. Cradle 40 and retaining member 60 are generally axially aligned so that in the use-position as shown in FIG. 3, the butt end of rod handle "H" will be received and engage the retaining member 60 to prevent it from pivoting upwardly. The forward end of the handle and the weight of the rod is supported primarily at the forward cradle 40. The reel "R" assumes a position intermediate the support and the retaining member as best seen in FIG. 3. Adjusting slide 50 along member 49 will adjust the holder for different rod and reel configurations and also will allow the fisherman to vary the angle of the rod. For example, as the slide and attached retainer are moved forward toward the arm 38, the angle of the retained rod will decrease towards horizontal.

A bore 70 extends through the lower end of the arm 64 and an aligned bore 72 extends through the end of arm 62. A retaining pin 80 has an elongate shank 82 with a head 84 at one end. The head 84 is secured to flexible element 85 shown as a chain. The other end of the chain attached to thumb screw 55. In the storage position, the pin 80 may be positioned in bore 88 in arm 38 as seen in FIG. 5. In the use-position, the pin is extended through the bores 70 and 72 across the open end of the retainer 60, as best seen in FIGS. 1 and 3.

The fishing rod holder of the present invention is convenient to use and easy to attach or mount to a suitable structure on the boat such as the rail "S". The mounting assembly 12 is positioned as shown in FIG. 1 and wing nuts 22 tightened to secure the mounting assembly. The holder may then be slipped onto the mounting assembly with the post 24 extending into the hollow tube 28. With the set screw 36 loosened, the fishing rod holder is free to rotate vertically about post 24. Retaining bar 45 is pivoted to the open position as shown in FIG. 4 and the pole inserted into the holder with the forward end of the handle "H" resting on the bight portion 44 of the forward U-shaped cradle 40. The rear retainer 60 is slidably adjusted to the desired position along member 48 and secured by tightening thumb screw 55. The rear of the handle "H" is received within the retaining member 60. The pin 80 is inserted in the apertures 70 and 72 to retain the handle within the retainer 50. This latter procedure is precautionary and not necessary in most cases. Gate 45 is pivoted to a closed position. The rod is then in a use-position with the tip of the pole "P" extending outwardly from the boat. The user may pivot the holder to any desired angular position and then lock the holder by tightening set screw or thumb screw 36. With some rod designs the pin 80 may be inserted through bores provided in the rod handle for additional security. The pin is stored in an out-of-the-way position in hole 88.

In the event of a strike or in the event the fisherman wishes to remove the pole, it is a simple matter to simply pivot gate 45 in either direction. This allows the user to grasp the handle "H" and lift the pole upwardly and forwardly to clear the butt end of the handle from the retaining member 60.

The holder of the present invention can be manufactured from any variety of materials. The tubular members may be aluminum or steel and the brackets and support members may be similarly configured from aluminum or steel and suitably painted, coated or anodized. It may be desirable to apply a rust-resistant finish or rubberized coating for protection of the device and also protection of the fishing tackle and boat. The holder may be manufactured in either a right or left hand configuration.

Therefore, it is seen that the present invention achieves the objects and advantages set forth above and has been described and illustrated with respect to several preferred embodiments. It will be obvious to those skilled in the art to make various changes, alterations and modifications to the embodiments described herein and to the extent that these changes, alterations and modifications do not depart from the spirit and scope of the appended claims, they are intended to be encompassed therein.

I claim:

1. A fishing rod holder mountable on a boat structure comprising:
   (a) a mounting member attachable to the boat;
   (b) a generally vertically extending tube member being pivotal relative to said mounting member about a vertical axis;
   (c) an arm extending from said tube member;
   (d) a cradle member attached to said arm adapted to receive a portion of the fishing pole; and
   (e) a support member extending outwardly and downwardly from said first arm and having retaining means slidable thereon adapted to receive a portion of the fishing pole;
   (f) cradle member being generally U-shaped facing upwardly and wherein said retaining means is generally U-shaped and mounted generally downwardly facing and attached to said slidable retaining means; and
   (g) pin means selectively engageable with said U-shaped retaining means.

2. The holder of claim 1 wherein said slidable retaining means comprises a slide member engageable on said support member and being lockable along said support member.

3. The holder of claim 1 wherein said tube member defines an axially extending recess and wherein said mounting means includes a pivot shaft extending upwardly from said bracket and received within said tube member.

4. The holder of claim 1 further including means for securing said tube in a desired pivotal position about said vertical axis.

5. The holder of claim 1 having a weather protective coating thereon.

6. A fishing pole holder mountable on a boat structure comprising:
   (a) a mounting member attachable to the boat structure having clamping means and a vertical pivot shaft;
   (b) a vertical tube member having top and bottom ends, said bottom end defining a recess which receives said pivot shaft to provide a rotation about a vertical axis;
   (c) means associated with said tube member for locking said tube member at a predetermined position;
   (d) an arm extending from the upper end of said tube being generally perpendicular thereto;
   (e) an upwardly opening cradle on said arm for receiving a portion of said rod;
   (f) a support arm angularly depending from said arm;
   (g) a slide engageable with said support arm and having adjustment means for securing said slide in a predetermined position; and
   (h) retainer means on said slide for receiving a portion of the rod, said rctainer means being generally U-shaped and opening downwardly whereby the holder may be adjusted to accommodate various rod configurations.

7. The fishing pole holder of claim 6 further including a pin engageable across the opening of said retainer and attached by a flexible member to said holder.

* * * * *